O. E. PHILLIPS.
Hose-Patches.
No. 150,255. Patented April 28, 1874.
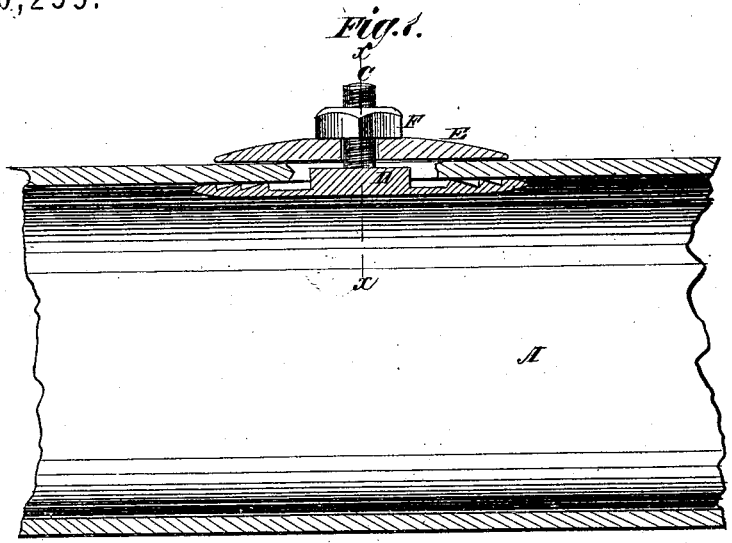
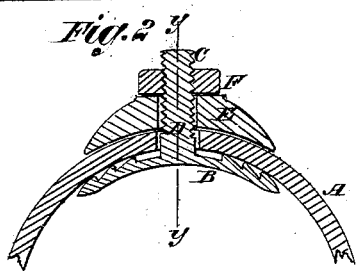
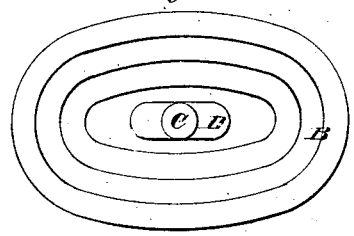
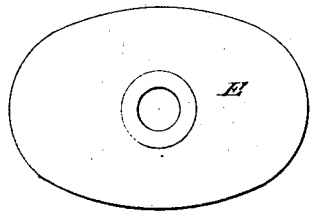
WITNESSES:
F. McArdle
Alex F. Roberts
INVENTOR:
O. E. Phillips
BY
ATTORNEYS.

UNITED STATES PATENT OFFICE.

OSCAR E. PHILLIPS, OF RICHMOND, VIRGINIA.

IMPROVEMENT IN HOSE-PATCHES.

Specification forming part of Letters Patent No. 150,255, dated April 28, 1874; application filed April 11, 1874.

*To all whom it may concern:*

Be it known that I, OSCAR E. PHILLIPS, of Richmond, in the county of Henrico and State of Virginia, have invented a new and useful Improvement in Hose-Patch, of which the following is a specification:

The object of this invention is to provide ready and convenient means for repairing hose or pipes employed for conducting water or other liquid, when from over pressure or other cause they have burst or holes have been made therein; and it consists in a metallic patch composed of an inner and an outer plate, between which the hose is clamped by means of one or more screws.

In the accompanying drawing, Figure 1 is a longitudinal section of a piece of hose, showing the patch applied, the section being on the line $y\ y$ of Fig. 2. Fig. 2 is a vertical section taken on the line $x\ x$ of Fig. 1. Fig. 3 is a view of the upper side of the inner plate. Fig. 4 is a top view of the outer plate.

Similar letters of reference indicate corresponding parts.

A represents the hose. B is the inner or stem plate. C is the screw-stem. D is the base of the stem on the inner plate, which is passed through the hose. E is the outer plate or cap-piece. F is the nut, which is turned down onto the plate E, as seen in the drawing. The inner plate may be in any desired form, but, preferably, oval, as the crack is usually lengthwise of the hose, especially when caused by bursting; but holes of other shapes are liable to be made by cutting, or by nails or other causes; consequently the patch-plates are made to correspond in some degree to the shape of the aperture. The plates are made convex and concave, as seen, to fit, or nearly fit, the diameter of the hose, and the convex side of the inner plate may be serrated, or made with one or more concentric grooves and ribs surrounding the base of the stem, so as to make a more perfect joint on the inside of the hose, but this is not an indispensable feature. The outer plate E is slipped onto the stem, and the nut F is turned down onto it, thus clamping the hose between the two plates, as represented, and effectually closing the hole or fracture. In applying the inner plate, a hole is cut with a knife or proper instrument in the crack or fracture to receive the base. This base is oblong, which serves to keep the patch in place. The hose is formed of sections coupled together in the usual manner, and the inner plate B is introduced at the end of the section and allowed to slide, by elevating one end of the section to the desired point, or until the stem enters the aperture, when the outer plate and nut are applied, as before stated.

This patch is most effectual for the purpose intended, and obviates all the objections to the old method of patching hose.

When a hose bursts and a long fracture is made, there may be two instead of one stem attached to the inner plate, and the stem or stems may be made separate, and pass through the outer plate, and screw into the inner plate, if desired, but I prefer the arrangement described.

Having thus described my invention, I claim as new, and desire to secure by Letters Patent—

1. A hose-patch, composed of two plates connected together by one or more screws, so as to clamp the hose between them, substantially as shown and described.

2. The inner plate B, having the base D and stem C attached, and the outer plate E, and screw-nut F, arranged substantially as and for the purposes described.

OSCAR E. PHILLIPS.

Witnesses:
 GEO. W. LEE,
 J. OSCAR GOODE.